No. 795,662. PATENTED JULY 25, 1905.
A. TAYLOR.
BICYCLE SUPPORT.
APPLICATION FILED DEC. 12, 1904.
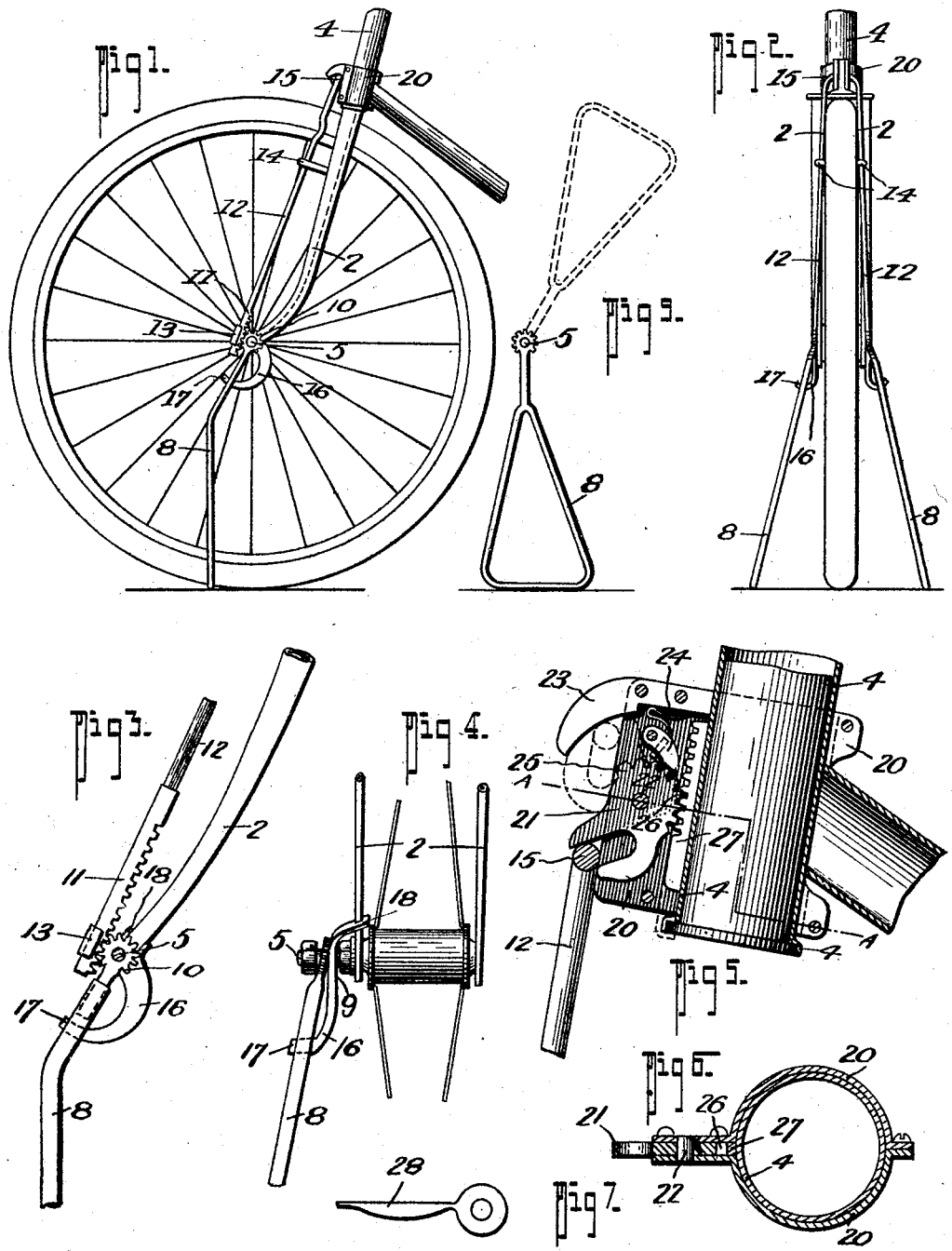
WITNESSES:
John T. Schrott,
F. C. Gibson.
INVENTOR
Alfred Taylor.
BY
Fred G. Dieterich
ATTORNEY

UNITED STATES PATENT OFFICE.

ALFRED TAYLOR, OF VICTORIA, CANADA.

BICYCLE-SUPPORT.

No. 795,662.           Specification of Letters Patent.           Patented July 25, 1905.

Application filed December 12, 1904. Serial No. 236,572.

*To all whom it may concern:*

Be it known that I, ALFRED TAYLOR, a citizen of the Dominion of Canada, residing in the city of Victoria, in the Province of British Columbia, Canada, have invented a new and useful Bicycle-Support, of which the following is a specification.

My invention relates to a bicycle-support of that class which forms an attachment to the frame of the bicycle itself and is portable with it.

It comprises two supporting-struts pivotally mounted one on each side of the wheel-fork of the bicycle-frame, which struts when not in use may be turned up alongside the fork members. The struts are simultaneously operable by rods extending up the fork members and connected together above the wheel diameter, which connected rods may be automatically locked to retain the struts in the down or supporting position, a bolt coöperative with the lock mechanism simultaneously securing the wheel-fork against turning in the frame of the machine and enabling it to swing free of the supports. The supports thus incidentally afford a means to secure the wheel and prevent it being taken away by mistake or with intent to steal.

The invention is fully described in the following specification, reference being made to the drawings which accompany it, in which—

Figure 1 shows the side elevation of the front wheel of a bicycle with the support in use, the dotted lines showing it in the upward position as when out of use; Fig. 2, a front end view of the same; Fig. 3, an enlarged detail of the pivotal attachment and operative mechanism of the support members; Fig. 4, an end elevation of the same; Fig. 5, an enlarged detail showing in side elevation and part section the lock device by which the supports are secured in the down position; Fig. 6, a sectional plan of the same on the line A A in Fig. 5; Fig. 7, the key by which the lock is released; Fig. 8, a detail of a clip for securing the support-pivot to the wheel-fork, and Fig. 9 an alternative form of support.

In the drawings the front-fork members of a bicycle are represented by 2, the collar of the front-fork stem by 3, and that front portion of the frame in which the fork is turnable is indicated by 4.

Pivotally mounted toward the lower end of each wheel-fork member 2 on pins 5 are the support members 8, the eye by which each is mounted on its pivot being an easy fit thereon, and the face 9, against which the inner side of the eye of the support bears, is outwardly beveled toward the lower side and is continued as a curved guide 16 to spread outward the lower ends of the supports 8 when turned down, so that they will afford a sufficient base as struts to support the bicycle. The extreme end of these guides 16 are outwardly turned, as at 17, to check the movement of the supports at the desired limit. Where the pivot-pin 5 is on the end of the wheel-axle, a portion of the guide member 16 is backwardly turned, as at 18, to clip the lower end of the fork 2 and secure it against rotation. The edge of the eye portion of each support member 8 is provided with gear-teeth 10, into which mesh corresponding teeth of a rack 11, provided at the lower ends of rods 12, which rods are endwise movable down the fork, each rod being slidable at the lower end in a guide 13, secured to or forming a part of the face 9, which guide preserves the rack in mesh. Toward the upper end each rod is supported in a guide or eye 14, secured to the fork members 2. The rods 12 are connected together at 15 above the wheel diameter, so that they may be operated simultaneously, and the loop of their junction affords a means by which they may be operated and by which they may be automatically locked to secure the supports in the downward position in a manner to be described later. These constitute the primary elements of the device. When the rods 12 are lifted up, the support members 8 will, by means of the rack-ends 11 engaging the toothed edge of the eye of each support member, be turned down, and the guide 16 will spread them apart, and when the rods 12 are pushed down the supports will be lifted from the ground and will be turned up alongside the fork members 2 of the bicycle-frame, in which position, being nearly balanced, they may be retained by a slight rounded detent in each rod 12 opposite to the guide-eye 14. Under these conditions when the supports are down a slight movement of the wheel forward would free it from the support of the members 8, and to prevent this it becomes necessary to lock the supports in the downward position, or, what is the same thing, to lock the operating-rods 12 at their extreme upward limit of movement. This locking is effected automatically in the following manner: On the lower part of the bicycle-frame, in which the front fork turns, a clasp 20 is secured in two halves, the line of junction being in the middle line, and in the forward joint, which is outwardly extended for the purpose and between which the required space is preserved, a lock-fork member 21 is pivotally secured on a pin 22. This lock-fork is so shaped that when its opening is turned down toward the junction-loop 15 of the rods 12 when these rods are down—that is, when the supports 8 are clear of the ground—the upper fork member will project in the path of 15 during its upward movement, so that such upward movement will turn the lock-fork member 21 and carry the open end of the fork within the guard 23. A small spring-controlled pawl 24 is so placed that it will engage a ratchet projection 25 in the fork member 21 and will retain or lock the fork member in this upward position. The release of this pawl when required is effected by a key 28, (see Fig. 7,) which being inserted in the key-opening 29 and pushed through will lift the pawl from engagement with the projection 25.

The edge of the fork member 21 opposite to the fork is furnished with a gear-segment 26, in which mesh the teeth of a slidable bolt 27, so that as the fork member 21 is turned to the upward position the bolt 27 will simultaneously be forced down and will enter notches cut in the bead of the bicycle front frame member 4 and the collar 3 of the wheel-fork stem and secure the latter against turning.

Where it may be inconvenient to connect the support members 8 to the wheel-axle, a small clip 30, as shown in Fig. 8, may be removably secured to each wheel-fork member 2, which clip will be furnished with a pivot-pin 5 to receive the eye of the support member and have a beveled face 9, curved guide 16, and rack-guide 13, as before described.

The supports may be formed as open triangular frames, as illustrated in Fig. 9 of the drawings.

When the device is applied to the rear or driving wheel of a bicycle, the slidable locking-bolt 27 may be omitted from the lock mechanism, as it will not be necessary.

Having now particularly described my invention and the manner of its operation, I declare that what I claim as new, and desire to be protected in by Letters Patent, is—

1. In a device of the class described; support members pivotally mounted toward the lower end of each fork member of a wheel, such members being operable on their pivots by a toothed segment round the eye of the supports and rods having rack-teeth at their lower end-guides for such rods, and said rods being endwise slidable in said guides down the fork members, means for retaining the supports when turned up alongside the fork, means for retaining the supports in the downward position, and a curved guide to spread each support during its movement to the downward position.

2. In a device of the class described; the combination with pivotally-mounted supports adapted to turn up alongside the fork of a wheel, rods each having a rack at their lower end connected together above the wheel diameter said support members being operatable by said racks at the lower end of said rods, means for retaining said rods in the downward position, and means for locking them in the upward position comprising, an attachment on the bicycle-frame a fork member pivotally secured to said attachment on the frame of the bicycle, the upper side of which fork will when turned down project in the path of the upward movement of the loop connecting the rack-rods, a guard behind which the open end of the fork will pass when moved to the upward position, and a pawl to retain the fork member in such upward position.

3. In a device of the class described; the combination with pivotally-mounted supports and rods by which they are operated, of a locking means to retain the supports in the downward position and secure the wheel-fork spindle against rotation, comprising, an attachment on said bicycle-frame a fork member pivotally mounted in said attachment to the frame of the machine, the upper side of which fork will when turned down project in the path of the loop connecting the rods by which the supports are operable, a guard behind which the opening of the fork will pass when the aforesaid loop is moved to its extreme upward position, a pawl by which the fork member will be retained in its upward position, a toothed segment on the edge of the fork member opposite to the fork and a bolt having rack-teeth to engage those of the segment, said machine-frame including a front post and a wheel-fork spindle having a collar provided with notches, said bolt being designed to be forced down into the notches through the bead of the front post of the machine-frame and collar of the wheel-fork spindle.

4. In a device of the class described; the combination with support members pivotally mounted toward the lower ends of the wheel-fork, each said support having a toothed segment round the edge of the eye by which it is mounted, of a looped rod having rack-teeth meshing with those of the support-eyes at each lower end, and a guide member secured on each support-pivot and to the wheel-fork member, such guide member being bent round at one end to form a guide for the rack end of the looped rod, and at the other end curved round and down, and outwardly inclined at the lower end so as to spread the support member from the wheel and outwardly turned at the end to afford a check for the support member at the downward position.

5. In a device of the class described; the combination with supports pivotally mounted to the lower part of the wheel-fork and connected rods by which such supports may be raised and lowered, a lock for securing the support-operating rods in their upward position, comprising, a clasp secured in two halves to the front post of the bicycle-frame the joint members of such clasps being extended toward the front and maintained the required distance apart, a small fork member pivotally mounted between them, a downwardly-projecting guard secured between the upper sides of the joint of the two clasp members behind which guard the open end of the jaw may be moved, a spring-controlled pawl mounted between the joint members of the clasp and designed to enter a detent in the edge of the fork member, a bolt slidable endwise between the joint members and provided with rack-teeth to engage similar teeth in the inner edge of the fork member, such bolt being designed to pass into a notch in the lower bead of the bicycle front post, and a corresponding notch in the collar of the wheel-fork post, and means for releasing the pawl from its engagement with the detent in the lock-fork.

In testimony whereof I have signed my name to this specification in the presence of two subscribing witnesses.

ALFRED TAYLOR.

Witnesses:
 ROWLAND BRITTAIN,
 ELLICE WEBBER.